United States Patent [19]
Endo et al.

[11] Patent Number: 5,553,530
[45] Date of Patent: Sep. 10, 1996

[54] PNEUMATIC BOOSTER

[75] Inventors: Mitsuhiro Endo; Kiyoshi Shirahata; Hiromi Ando, all of Yamanashi-ken, Japan

[73] Assignee: Tokico Ltd., Kanagawa-ken, Japan

[21] Appl. No.: 447,049

[22] Filed: May 22, 1995

[30] Foreign Application Priority Data

May 23, 1994 [JP] Japan ........................................ 132549

[51] Int. Cl.$^6$ ..................................................... B60T 13/52
[52] U.S. Cl. ........................................................... 91/369.3
[58] Field of Search ................................. 91/369.3, 369.4

[56] References Cited

U.S. PATENT DOCUMENTS

| | | | |
|---|---|---|---|
| 4,587,885 | 5/1986 | Boehm et al. | 91/369.3 X |
| 4,590,845 | 5/1986 | Tateoka et al. | 91/369.3 X |
| 4,598,625 | 7/1986 | Belart | 91/369.3 |
| 4,951,550 | 8/1990 | Ohki et al. | 91/369.3 |
| 5,121,674 | 6/1992 | Uyama | 91/369.3 |

FOREIGN PATENT DOCUMENTS

56-146453  11/1981  Japan ..................................... 91/369.4

Primary Examiner—John E. Ryznic
Attorney, Agent, or Firm—Wenderoth, Lind & Ponack

[57] ABSTRACT

A plunger moved with an input shaft is movably fitted in an axial bore of a valve body made of resin, and a valve mechanism selectively establishes and cuts off communication in a negative pressure passage and an atmosphere passage formed in the valve body according to the movement of the plunger. Also, a pair of radial holes formed to have a circular cross section are provided in the valve body by drilling work, and a plate type stop key formed in a fork shape having two claw branches is mounted by loosely inserting the branches in the radial holes. The stop key limits a movement range of the plunger. Also, a guide portion is formed on an outer circumference of the valve body to guide side surfaces of the stop key. The movement of the stop key is restricted by the guide portion and a step formed in the axial bore of the valve body. Therefore, a smooth operation of the pneumatic booster can be guaranteed.

3 Claims, 6 Drawing Sheets

PNEUMATIC BOOSTER

BACKGROUND OF THE INVENTION

1. Field of the Invention

The present invention relates to a pneumatic booster utilized for a brake system of a vehicle or the like.

2. Description of the Prior Art

A pneumatic booster, which is well-known, is provided with a housing partitioned into a constant pressure chamber and a variable pressure chamber by a diaphragm, a power piston attached to the diaphragm, and a valve body attached to the power piston. In the valve body, a plunger is provided. The plunger receives a power generated by the operation of a brake pedal. The communication between the constant pressure chamber and the variable pressure chamber and the communication between the variable pressure chamber and the outside air are respectively controlled according to a relative movement between the valve body and the plunger, and the valve body receives a pressure caused by a differential pressure between the constant pressure chamber and the variable pressure chamber.

In the above well-known pneumatic booster, a stop key is provided to limit a positional relationship between the valve body and the plunger within a predetermined range. The stop key is inserted in a hole formed in the valve body, and a portion of the key fits into a channel formed in the plunger. However, because the hole is formed to have a rectangular cross section, it takes a long time to machine the hole. Also, in case where the hole is formed at the same time as the valve body is molded, there is a problem that a mold for the valve body becomes complicated.

SUMMARY OF THE INVENTION

An object of the present invention is to provide, with due consideration to the drawbacks of such a conventional pneumatic booster, a pneumatic booster in which a radial direction hole utilized to insert a key is easily formed by machining and easy formation of the hole greatly contributes to improvement in molding operation for the valve body.

The object is achieved by the provision of a pneumatic booster which includes a housing partitioned into a constant pressure chamber and a variable pressure chamber by a power piston having a diaphragm; and a valve body having a negative pressure passage which communicates the constant pressure chamber to the variable pressure chamber and an atmosphere passage which communicates the variable pressure chamber to the outside of the housing. The valve body is supported by the power piston. There is a plunger movably provided in an axial bore which has a step and is formed in the valve body. The plunger is moved with an input shaft. There is also a valve mechanism for selectively establishing and cutting off communication in the negative pressure passage and the atmosphere passage according to the movement of the plunger. The valve mechanism is placed between the valve body and the plunger.

A plate type stop key is loosely inserted in a radial direction hole formed in the valve body. The distal end portion of the stop key fits in a circumference channel of the plunger to regulate the movement of the plunger. The booster is characterized in that a guide portion for guiding side surfaces of the stop key is formed on the circumference of the plunger to prevent the rotational movement of the stop key. The radial direction hole is formed to have a circular cross section by machining to place the surface of the step of the axial bore of the valve body in the radial direction hole.

In the above configuration of the pneumatic booster, because the radial direction hole utilized to insert the stop key is formed to have a circular cross section, the hole can be easily formed by machining such as drilling work. Also, because the rotational movement of the stop key inserted in the radial direction hole is guided by the guide portion provided in the valve body, an uneven contact between the stop key and an inside surface of the hole can be prevented and therefore the movement of the stop key in the axial direction of the plunger can be smoothed. Also, because the stop key engages the surface of a step of the axial bore of the valve body, the movement of the input shaft can be reliably transmitted to the valve body.

DETAILED DESCRIPTION

A conventional pneumatic booster is initially described with reference to the drawings prior to the description of a pneumatic booster according to the present invention to easily understand the pneumatic booster.

Figure 8:
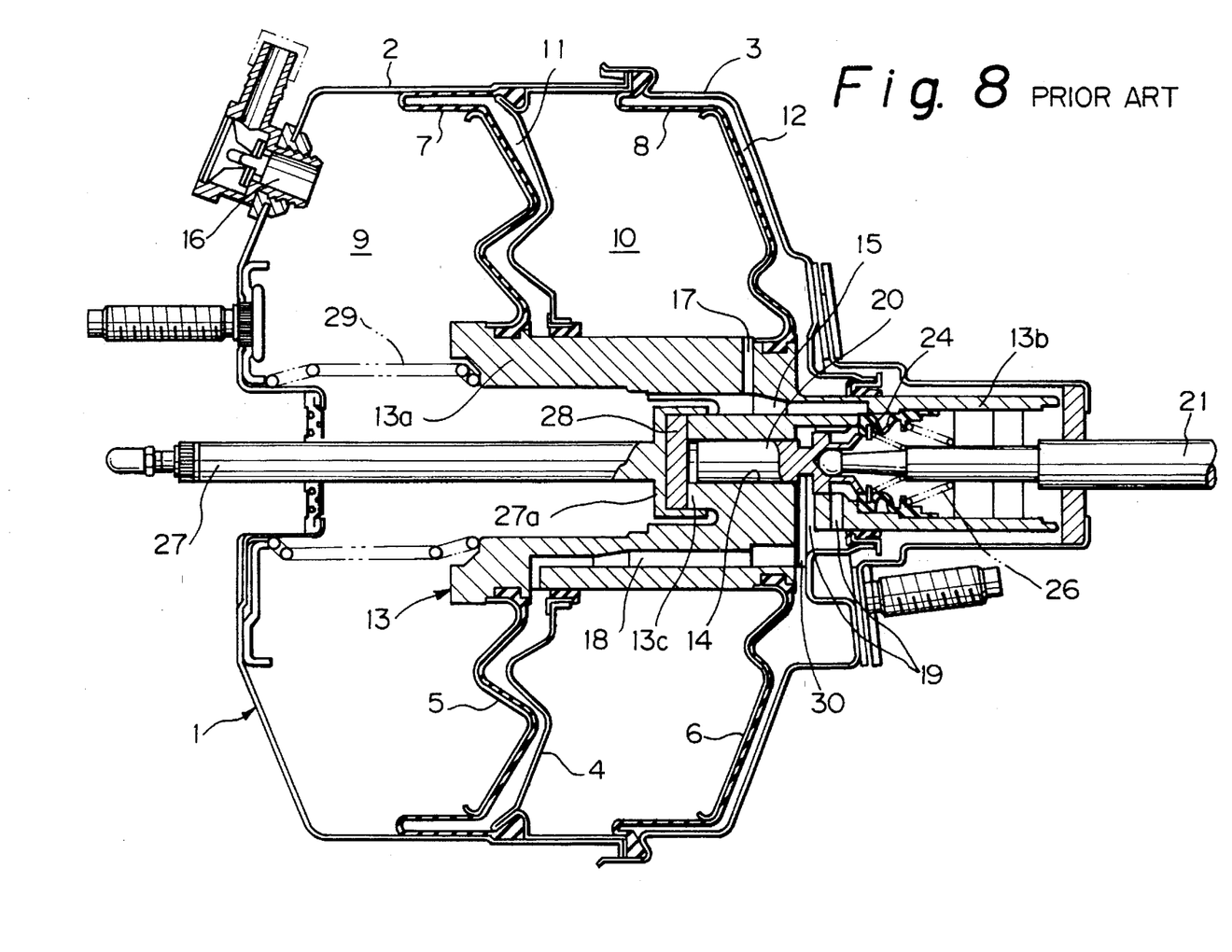
FIG. 8 is a cross sectional view showing the general structure of a conventional tandem type pneumatic booster.
Figure 9:
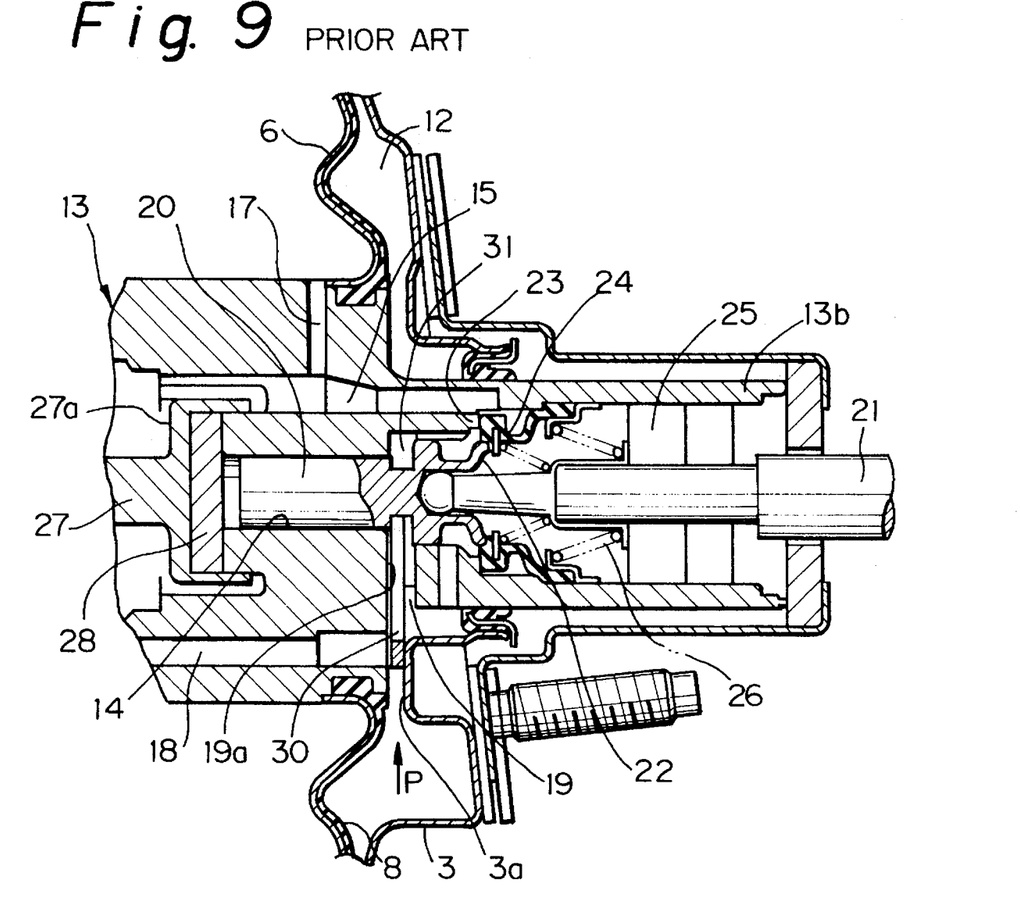
FIG. 9 is a cross sectional view showing the structure of a main portion of the conventional tandem type pneumatic booster.

The configuration of a conventional pneumatic booster is shown in FIGS. 8 and 9, as an example. In FIGS. 8 and 9, a tandem type conventional pneumatic booster is shown. In the conventional pneumatic booster, a housing 1 having a front shell 2 and a rear shell 3 is partitioned into a front chamber and a rear chamber by a center plate 4. The front chamber is partitioned into a constant pressure chamber 9 and a variable pressure chamber 11 by a diaphragm 7 having a power piston 5, and the rear chamber is partitioned into a constant pressure chamber 10 and a variable pressure chamber 12 by a diaphragm 8 having a power piston 6. In the housing 1, a valve body 13 is disposed along the axial direction of the housing 1. The valve body 13 is movably supported by the center plate 4 and the rear shell 3 and is gas-tightly connected to the power pistons 5 and 6 and the diaphragms 7 and 8.

The valve body 13 is composed of a cup section 13a placed at a front side and a cylindrical section 13b placed at a rear side. The interior of the cup section 13a is connected to the interior of the cylindrical section 13b through a stepped axial bore 14 extending along the center axis of the valve body 13 and a plurality of negative pressure passage 15 arranged in parallel to the axial bore 14. In a front surface of the front shell 2, an inhaling nozzle 16 with a check valve for introducing an engine negative pressure is provided. In the valve body 13, a first communication passage 17 connecting the rear side constant pressure chamber 10 and the negative pressure passages 15 is provided. The engine negative pressure introduced from the inhaling nozzle 16 to the front side constant pressure chamber 9 is supplied to the rear side constant pressure chamber 10 through the negative pressure passages 15 and the communication passage 17 of the valve body 13 without any pressure change. Also, in the valve body 13, a plurality of atmosphere passages 18 communicating the front side variable pressure chamber 11 with the rear side variable pressure chamber 12 are arranged in parallel to the axial bore 14 of the valve body 13. Also, a second communication passage (or a radial direction hole) 19 communicating the rear side variable pressure chamber 12 with the axial bore 14 is arranged in a radial direction. The atmosphere transmitted from a rear end of the valve body 13 to the cylindrical section 13b of the valve body 13 is introduced in the variable pressure chambers 12 and 13 through the second communication passage 19 and the atmosphere passages 18.

In the axial bore 14 of the valve body 13, a plunger 20 is movably fitted. In a rear end portion of the plunger 20, front end of an input shaft 21 operated through a brake pedal (not shown) is workably connected to the plunger. Also, seat sections 22 and 23 (FIG. 9) are formed at a rear end of the plunger 20 and an open end of the negative passages 15. On the other hand, in the cylindrical section 13b of the valve body 13, a valve member 24 sealingly engageable with and separable from the seat sections 22 and 23 is provided. The valve member 24 is always pushed in a valve closing direction by the function of a spring 26 of which one end is fixed to a spring receiver 25 fitted on the input shaft 21. A boss section 13c is formed in a bottom section of the cup section 13a of the valve body 13. On the boss section 13c, a base end large diameter section 27a of an output shaft 27 gas-tightly penetrating through the front shell 2 is fitted, with a reaction disk 28 made of rubber being disposed therebetween. An outer end of the output shaft 27 is workably connected to a master cylinder (not shown). Also, in the front side constant pressure chamber 9, a return spring 29 for returning the valve body 13 from a working position to a non-working position is provided.

In addition, a plate type stop key 30 is inserted in the second communication passage 19 formed in the valve body 13 by which the rear side variable pressure chamber 12 and the axial bore 14 communicate. The stop key 30 regulates the movement of the plunger 20 in the axial direction, and a top end of the stop key 30 fits in a circumference channel 31 (FIG. 9) of the plunger 20. The stop key 30 is formed in a fork shape to have two claw branches, and the claw branches of the stop key 30 extend on both sides of the plunger 20 through the circumference channel 31. Here, the portions above and below the central line in each of FIGS. 8 and 9 show different cross sections. If a cross section of the upper half and that of the lower half were taken along the same plane, the second communication passage 19 would have been shown to extend from one side of the valve body 13 to the opposite side in a radial direction of the valve body 13, and the top end portions of the stop key 30 would have been shown to extend through the circumference channel 31 to reach the side opposite to the insertion side.

In the above configuration of the conventional pneumatic booster, when the brake pedal is pushed in such a condition that the conventional pneumatic booster is, as shown in FIG. 8, set in a non-working portion, the input shaft 21 goes ahead, the plunger 20 leftwardly moves (or goes ahead) as viewed in FIG. 8, and the seat section 22 of the plunger 20 is separated from the valve member 24. Therefore, the atmosphere is transmitted to the rear side variable chamber 12 through the second communication passage 19, and the atmosphere is also transmitted to the front side variable pressure chamber 11 through the atmosphere passages 18. As a result, a differential pressure occurs between a group of the constant pressure chambers 9 and 10 in which the engine negative pressure is introduced and a group of the variable pressure chambers 11 and 12, and the thrust pushing the two power pistons 5 and 6 in the forward direction is generated. The thrust is transferred to the output shaft 27 through the reaction disk 28, and a pneumatic boost action is started.

Thereafter, when the brake pedal is further pushed, the reaction disk 28 is elastically deformed by reaction power, a part of the reaction disk 28 is projected into the axial bore 14, and the reaction power is transferred to the input shaft 21 through the plunger 20. Thereafter, when the brake pedal is released by removing a power pushing the brake pedal, the plunger 20 is pushed by the reaction disk 28 to move the plunger rightwardly, and the valve member 24 is pushed and opened by the movement of the seat section 22 of the plunger 20 while the plunger 20 is moved. As a result, the introduction of the atmosphere into the rear side variable chamber 12 is stopped, a negative pressure is led to the both variable pressure chambers 11 and 12 through the negative pressure passages 15 and the second communication passage 19. Thus, differential pressure is lowered, and the thrust is reduced. Thereafter, when the brake pedal is completely released, the valve body 13 is returned to the initial position by the effect of the return spring 29. The valve member 24 is tightly pressed against the seat sections 22 and 23, and the conventional pneumatic booster is returned to the non-working condition.

Figure 10:
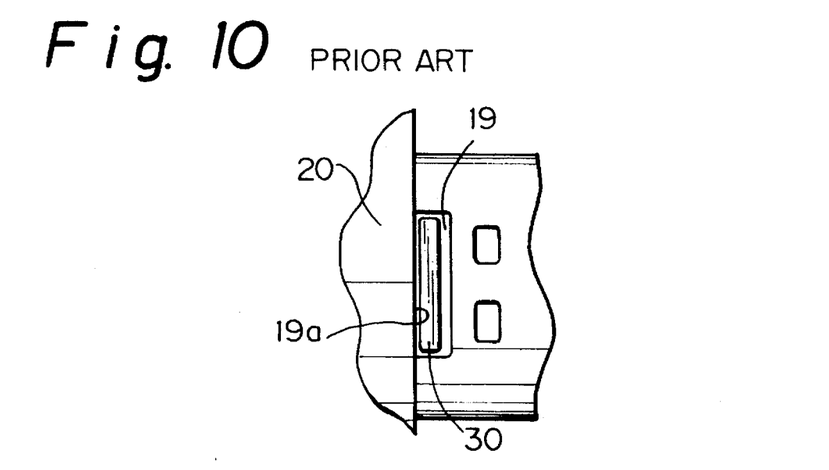
FIG. 10 is a plan view taken generally along an arrow P shown in FIG. 9.

In this case, the stop key 30 limits the position of the plunger 20. Also, the stop key 30 plays an important role to transfer the movement of the input shaft 21 to the valve body 13 through the plunger 20. Therefore, it is required to accurately limit a movement range of the stop key 30 in the axial direction. Therefore, as shown in FIG. 10, a cross section of the second communication passage 19 (hereinafter, called a key insert hole) is formed in a rectangular shape to use the passage 19 as an insert hole so that a surface of the stop key 30 engages with the front wall 19a of the key insert hole 19 to restrict the forward movement of the plunger 20. In this case, it is difficult to form the key insert hole 19 by machining because the key insert hole 19 is in the rectangular shape and, therefore, production costs of the conventional pneumatic booster are increased. Therefore, because the valve body 13 is made of resin, it is usually achieved that the key insert hole 19 is formed simultaneously when the valve body 13 is molded.

However, in the valve body 13, not only the axial bore 14 but also a plurality of negative pressure passages 15 and the atmosphere passages 18 are formed in the axial direction. Therefore, in case where the key insert hole 19 extending in the radial direction of the valve body 13 is formed simultaneously with the formation of the bore 14 and the passages 15, 18, a mold configuration of the valve body 13 becomes too complicated and it is difficult to separate the mold of the valve body 13 from the produced valve body 13. Therefore, there is a problem that production costs of the conventional pneumatic booster cannot be reduced.

A preferred embodiment of a pneumatic booster according to the present invention is now described.

FIGS. 1 to 5 show a pneumatic booster according to the present invention. The general constitution of the pneumatic booster is the same as that shown in FIGS. 8 and 9. Therefore, the elements shown in FIGS. 1 to 5 which are identical to the elements shown in FIGS. 8 and 9 are denoted by the same reference signs and the description of these elements are omitted.

Figure 1:
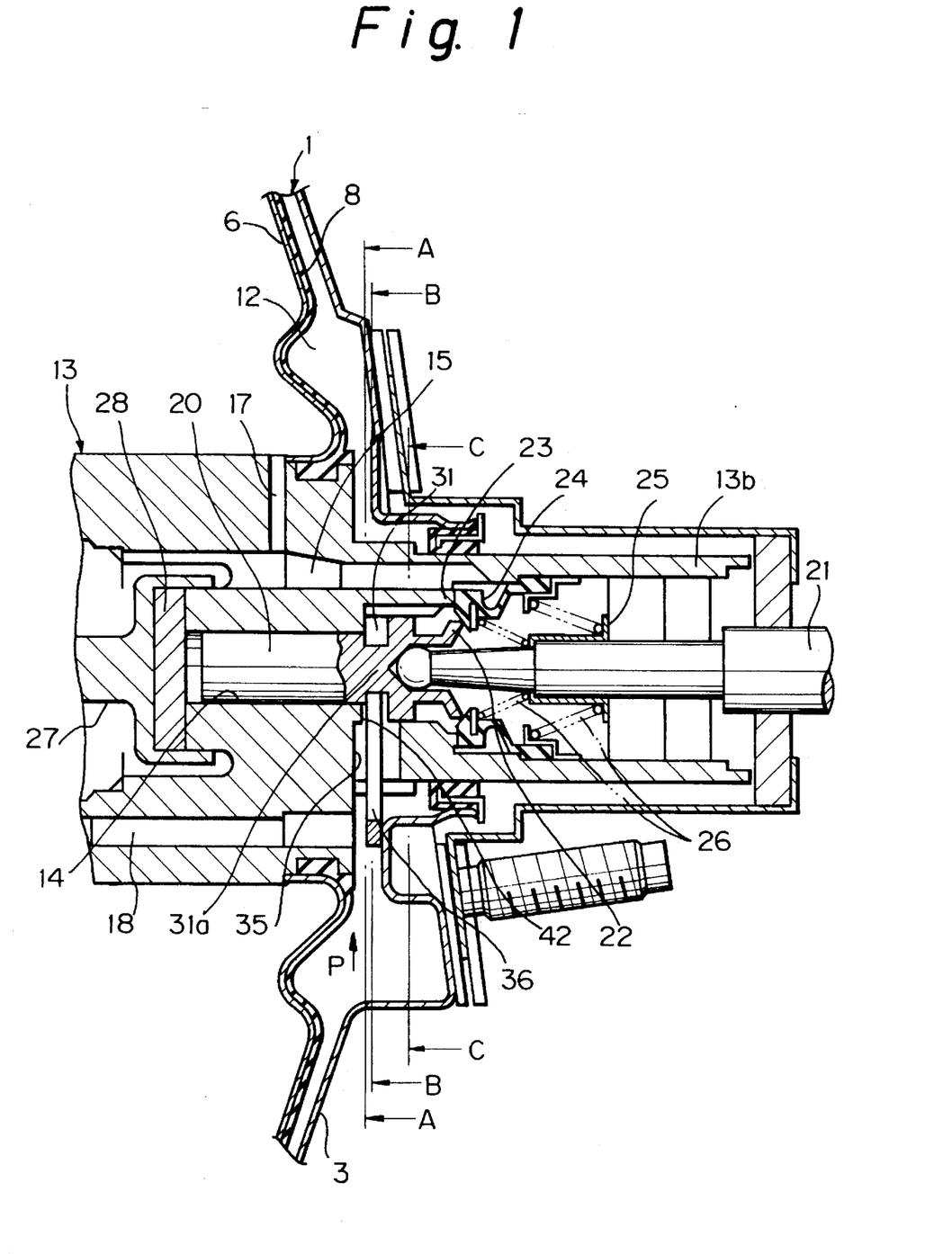
FIG. 1 is a cross sectional view showing the structure of a main portion of a pneumatic booster according to the present invention.
Figure 2:
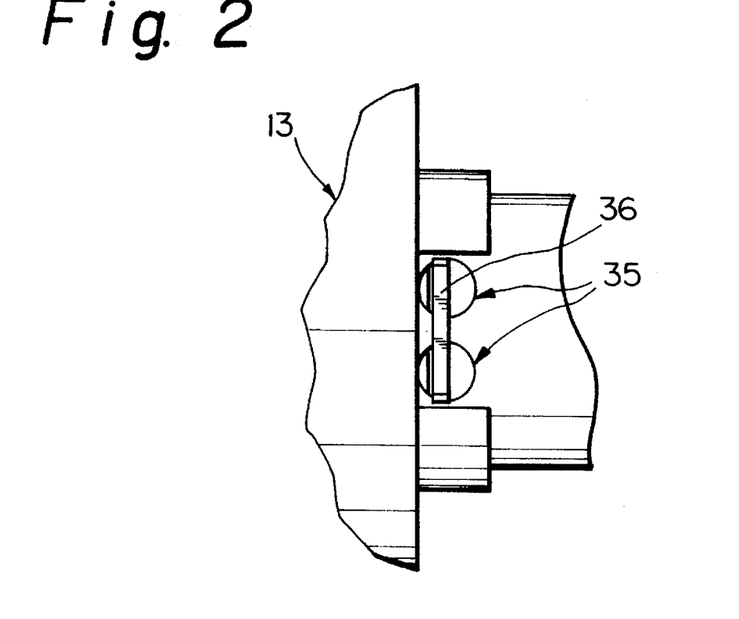
FIG. 2 is a plan view taken generally along an arrow P shown in FIG. 1.
Figure 3:
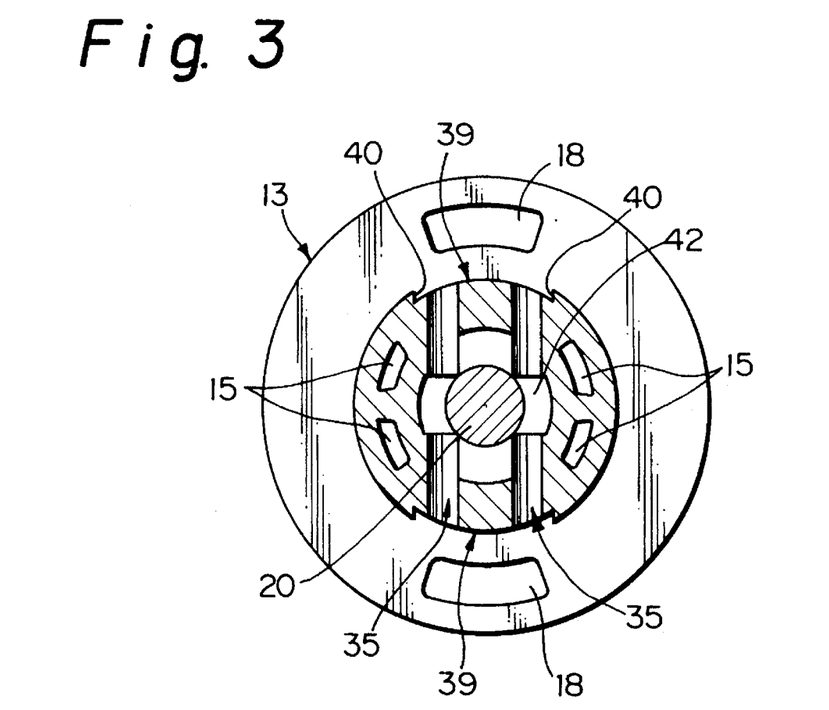
FIG. 3 is a cross sectional view taken generally along a line A—A.
Figure 4:
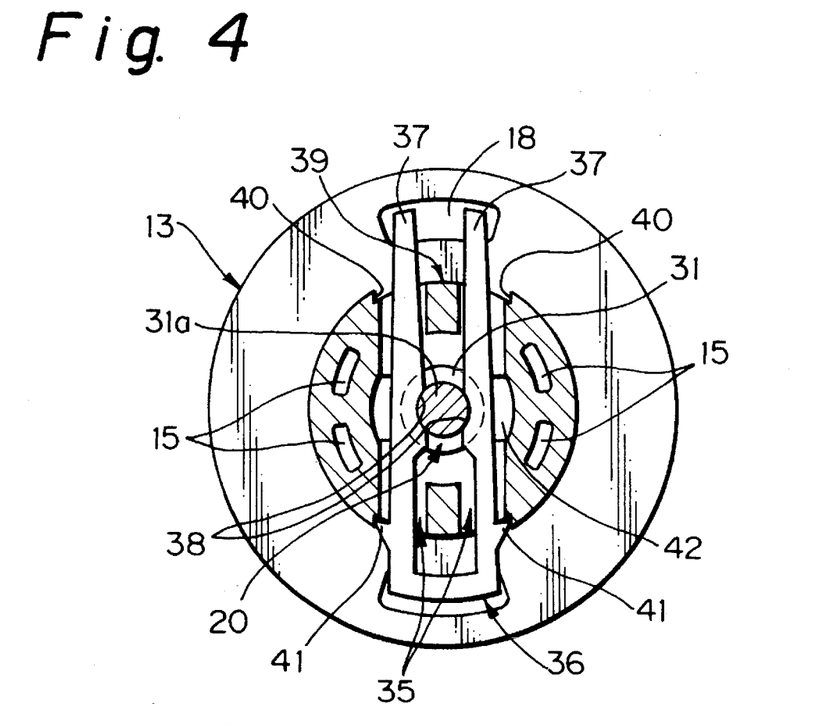
FIG. 4 is a cross sectional view taken generally along a line B—B.
Figure 5:
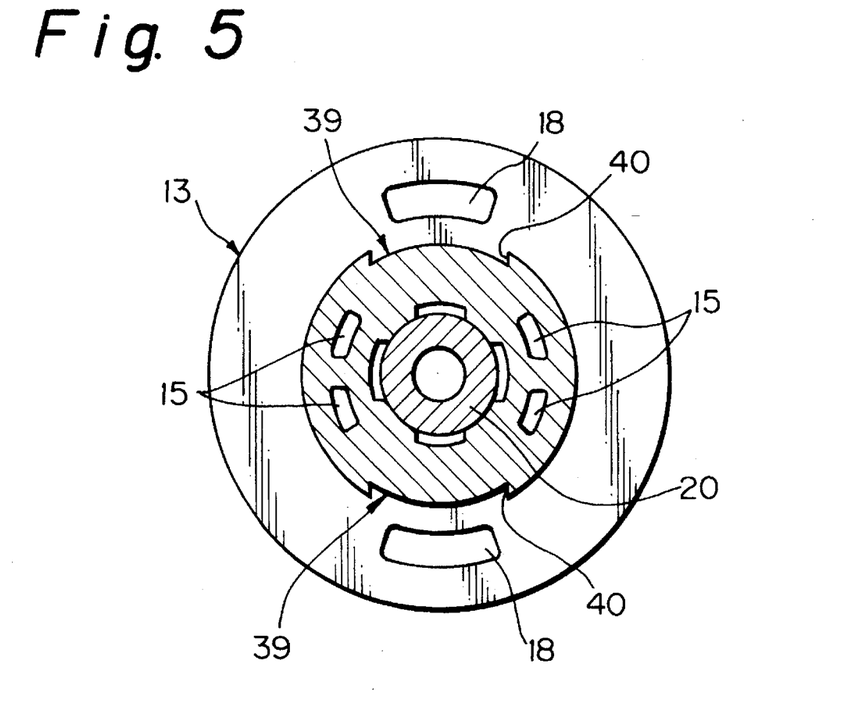
FIG. 5 is a cross sectional view taken generally along a line C—C.

In this embodiment, a pair of key insert holes (or a pair of radial direction holes) 35 of the valve body 13 are formed so that they are spaced in a circumference direction of the valve body 13. Each of the holes 35 is formed to have a circular cross section. On the other hand, a stop key 36 regulating the movement of the plunger 20 is formed in a fork shape having two claw branches 37, and the claw branches 37 are inserted in the key insert holes 35, respectively. In a middle section of each of the claw branches 37 of the stop key 36 in a longitudinal direction, a recess 38 is formed to face inwardly so that it can engage with a small diameter section 31a placed at the bottom of the circumference channel 31 of the plunger 20 (FIG. 4). When the stop key 36 is inserted in the holes 35, the two claw branches 37 are elastically deformed and the recess 38 engage with the small diameter section 31a to prevent the stop key 36 from coming out from the holes 35.

Figure 6:
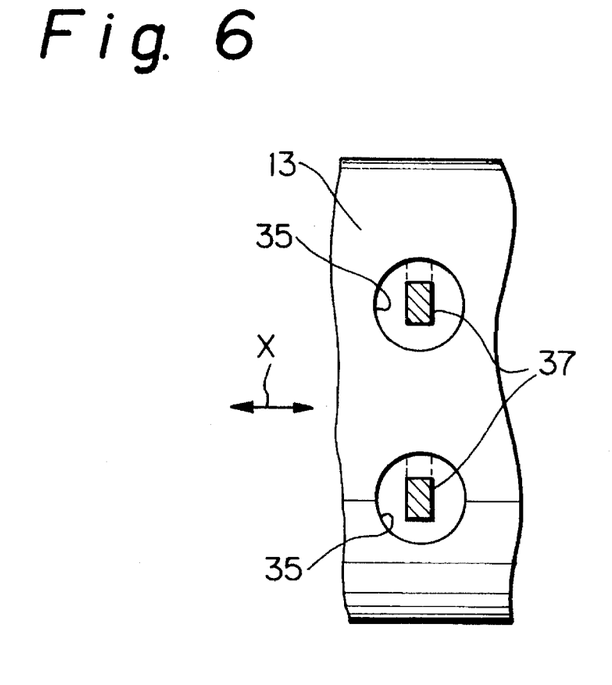
FIG. 6 is a schematic illustration showing a relationship between a radical direction hole and a stop key.
Figure 7:
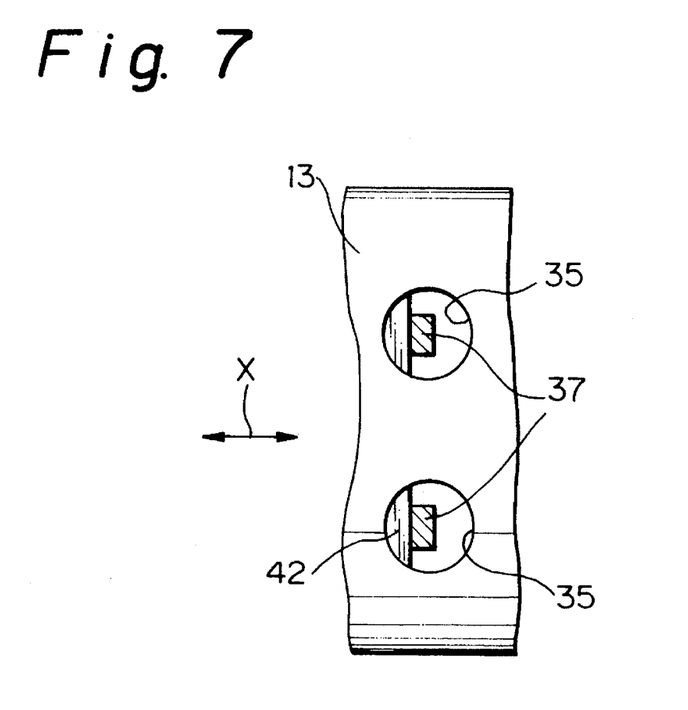
FIG. 7 is another schematic illustration showing another relationship between the radial direction hole and the stop key.

In the outer circumference of the valve body 13, guide portion 39 in a groove shape are formed to extend across the open ends of the pair of key insert holes 35. Each guide portion 39 has a pair of guide surfaces 40 extending in parallel to each other in the axial direction of the valve body 13. Lugs 41 projecting from the two claw branches 37 of the stop key 36 are formed to slidably engage with the guide surfaces 40 (FIG. 4). The portion 39 play a role to prevent the rotational movement of the stop key 36 by guiding the side surfaces of the stop key 36. Therefore, as shown in FIG. 6, each of the claw branches 37 of the stop key 36 can be moved in the axial direction X of the valve body 13 along a line perpendicularly intersecting the center line of the hole 35 without being shifted to one side of the hole 35 (as is shown by dotted lines). On the other hand, the plane of a step 42 of the axial bore 14 of the valve body 13 is positioned in the key insert holes 35. The step 42 plays a role to limit the axial direction movement (that is, forward movement) of the stop key 36. As shown in FIG. 7, a surface of each of the claw branches of the stop key 36 engages the surface of the step 42.

The step 42 is formed simultaneously with the molding of the valve body 13 made of resin. On the other hand, the key insert holes 35 are made by drilling after the molding of the valve body 13. In this case, the drilling of the holes 35 is started from an outer circumferential surface of the valve body 13 in an area which includes the step 42 and the drilling of the holes 35 is stopped when the holes reach the portion of the axial bore 14 in front of the step 42 so that the surface of the step 42 can be seen in the holes 35. In other words, the drilling work is performed from two outer circumferential surface portions of the valve body 13 spaced from each other by 180 degrees with respect to the center line of the valve body 13 to form two drilled holes on each side so that the inner ends of the drilled holes face each other with the surface of the step 42 of the valve body 13 existing therebetween. Thus, each key insert hole 35 is composed of the two drilled holes and the particular portion of the axial bore 14 in front of the step 42 so that the key insert hole 35 extends through the valve body 13 in the radial direction of the valve body 13.

In the above constitution of the pneumatic booster, when the brake pedal is pushed, the pushing power is transferred to the plunger 20 through the input shaft 21, the plunger 20 goes ahead, and the seat section 22 of the plunger 20 is separated from the valve member 24, in the same manner as in the prior art. Therefore, the atmosphere is introduced to the rear side variable pressure chamber 12 and the front side variable pressure chamber 11 through the key insert holes 35, and a pneumatic boost action is started. In this case, because the stop key 36 is guided by the guide portion 39, the stop key 36 is smoothly moved relatively to the valve body 13 in the axial direction of the valve body 13 without causing sidewise offset in the holes 35 (FIG. 6). Therefore, a required amount of movement of the plunger 20 is guaranteed. After the plunger is moved by the required amount, the surfaces of the stop key 36 engage with the surface of the step 42 positioned in the holes 35. Thus, the movement of the input shaft 21 is reliably transferred to the valve body 13 (FIG. 7).

In the above embodiment, the pair of key insert holes 35 are formed and the two claw branches 37 of the stop key 36 are inserted in the key insert holes 35. The small diameter section 31a of the plunger 20 is put between the two claw branches 37 to arrest the stop key 36. Therefore, a position of the stop key 36 can be reliably maintained, and the movement of the input shaft 21 caused by the movement of the brake pedal can be more stably transferred to the valve body 13. When the brake pedal is released by removing a power pushing the brake pedal, the plunger 20 goes back in the same manner as in the prior art. The negative pressure passages 15 communicate with the both variable pressure chambers 12 and 11 through the key insert holes 35, and the thrust is reduced. Thereafter, when the brake pedal is completely released, the pneumatic booster is returned to the beginning non-working condition.

As is described above, in the pneumatic booster according to the present invention, because the radius direction holes utilized to insert the stop key are formed to have circular cross sections, the holes can be easily formed by machining such as a drilling work or the like. Also, a smooth movement of the stop key and a reliable transmission of the input can be guaranteed, and the reliability for the pneumatic booster can be increased.

What is claimed is:

1. A pneumatic booster, comprising:

a housing partitioned into a constant pressure chamber and a variable pressure chamber by a power piston having a diaphragm;

a valve body having a negative pressure passage which communicates the constant pressure chamber to the variable pressure chamber and an atmosphere passage which communicates the variable pressure chamber to the outside of the housing, the valve body being supported by the power piston;

a plunger movably provided in an axial bore which has a step and is formed in the valve body, the plunger being movable in response to the movement of an input shaft;

a valve mechanism for selectively establishing and cutting off communication in the negative pressure passage and the atmosphere passage according to the movement of the plunger, the valve mechanism being placed between the valve body and the plunger;

at least one radial hole formed in the valve body; and a plate type stop key loosely inserted in the radial hole, a distal end portion of the stop key fitting in a circumference channel of the plunger to restrict the movement of the plunger, characterized in that the pneumatic booster further comprises a guide portion formed on the periphery of the valve body for guiding side surfaces of the stop key to prevent the rotational movement of the stop key, and that said radial hole is formed to have a circular cross section by machining to place the surface of said step of the axial bore of the valve body in the radial hole.

2. A pneumatic booster according to claim 1 in which said at least one radial hole is provided by a pair of radial holes spaced from each other along a circumference direction of the valve body and the stop key is formed in a fork shape having two claw branches; and the claw branches are inserted in the pair of radial holes, respectively.

3. A pneumatic booster according to claim 1 in which said valve body is made of a resinous material.

* * * * *